(12) United States Patent
McGuffin

(10) Patent No.: US 9,193,614 B2
(45) Date of Patent: Nov. 24, 2015

(54) METHOD AND APPARATUS FOR TREATMENT OF WATER AND WASTEWATER

(71) Applicant: Thomas R. McGuffin, Spanish Fort, AL (US)

(72) Inventor: Thomas R. McGuffin, Spanish Fort, AL (US)

( * ) Notice: Subject to any disclaimer, the term of this patent is extended or adjusted under 35 U.S.C. 154(b) by 228 days.

(21) Appl. No.: 13/735,137

(22) Filed: Jan. 7, 2013

(65) Prior Publication Data
US 2015/0307381 A1 Oct. 29, 2015

(51) Int. Cl.
*C02F 3/12* (2006.01)
*B01D 35/027* (2006.01)
*C02F 1/78* (2006.01)
*B01F 3/04* (2006.01)

(52) U.S. Cl.
CPC .................................. *C02F 1/78* (2013.01)

(58) Field of Classification Search
CPC ........ C02F 1/78; C02F 3/1284; C02F 3/1242; B01D 21/0039; B01D 21/0042
USPC .................. 210/205, 760, 627, 620; 261/123, 261/DIG. 42
See application file for complete search history.

(56) References Cited

U.S. PATENT DOCUMENTS

| | | |
|---|---|---|
| 3,966,608 A | 6/1976 | Mason et al. |
| 4,002,561 A | 1/1977 | Traverse |
| 5,637,231 A | 6/1997 | Hill et al. |
| 5,976,384 A | 11/1999 | Campbell et al. |
| 7,361,270 B2 | 4/2008 | McBride |
| 7,718,067 B2 * | 5/2010 | Holt .............................. 210/615 |
| 7,963,508 B1 | 6/2011 | McGuffin |

* cited by examiner

*Primary Examiner* — Nam Nguyen
*Assistant Examiner* — Claire Norris
(74) *Attorney, Agent, or Firm* — George L Williamson

(57) ABSTRACT

Method and apparatus for sealed pressurized enclosure containing a sludge digester designed to receive wastewater from commercial establishments for the purpose of removing fats, oils and greases using the high velocity impact provided by the sludge digester. Air containing ozone is pumped through the sludge digester causing a flow of material so that the stream of material is directed onto a series of stationary concentric ridges wherein the solids in the liquid material are forcefully impacted against the stationary concentric ridges so as to break the solid particles up into smaller particles.

8 Claims, 3 Drawing Sheets

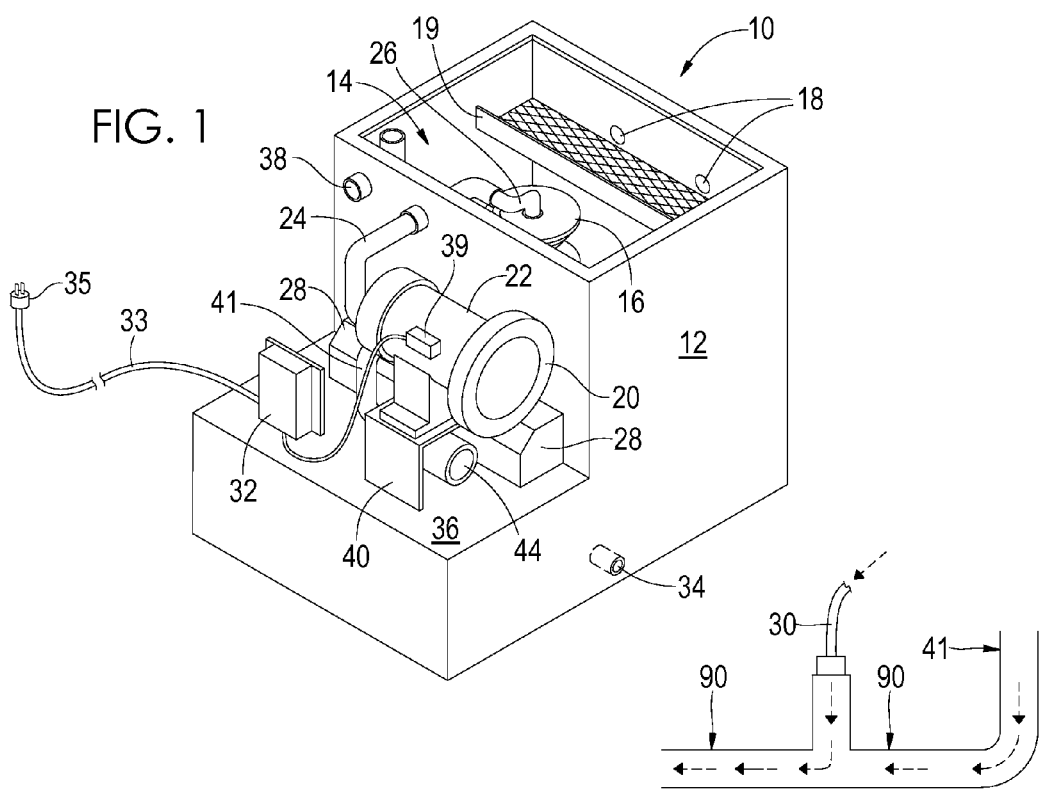
FIG. 1
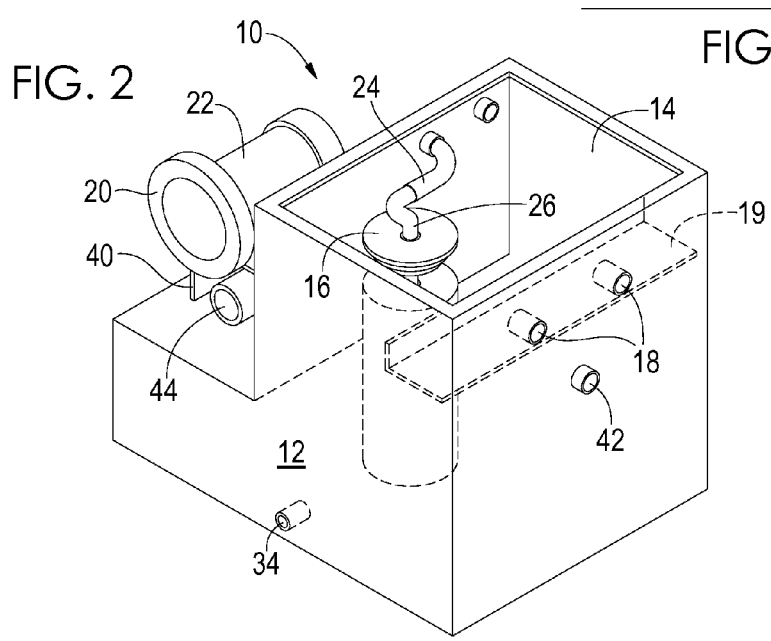
FIG. 2
FIG. 3

METHOD AND APPARATUS FOR TREATMENT OF WATER AND WASTEWATER

BACKGROUND OF THE INVENTION

1. Field of the Invention

The present invention relates generally to water and wastewater treatment and, more particularly, is concerned with domestic and industrial wastewater treatment.

2. Description of the Related Art

Devices related to the present invention have been described in the related art, however, none of the related art devices disclose the unique features of the present invention. In U.S. Pat. No. 7,963,508 dated Jun. 21, 2011, McGuffin disclosed a method and apparatus for digesting sludge. In U.S. Pat. No. 7,361,270 dated Apr. 22, 2008, McBride disclosed an apparatus for water treatment. In U.S. Pat. No. 5,976,384 dated Nov. 2, 1999, Campbell, et al., disclosed a process for treating wastewater. In U.S. Pat. No. 3,966,608 dated Jun. 29, 1976, Mason, et al., disclosed a liquid treatment apparatus. In U.S. Pat. No. 4,002,561 dated Jan. 11, 1977, Traverse disclosed a method and apparatus for aerobic sewage treatment. In U.S. Pat. No. 5,637,231 dated Jun. 10, 1997, Hill, et al., disclosed a method and apparatus for using ozone in a pressure vessel for treating pollutants.

While these devices may be suitable for the purposes for which they were designed, they would not be as suitable for the purposes of the present invention as hereinafter described.

SUMMARY OF THE PRESENT INVENTION

The present invention discloses a sealed pressurized enclosure constructed of stainless steel and designed to receive wastewater or grey water from commercial establishments, such as restaurants, and residential dwellings for the purpose of oxidizing and removing fats, oils and greases (hereinafter sometimes referred to as "FOG") on contact.

The device comprises a compact tank typically located beneath a commercial sink or dish washer and contains a suitably sized sludge digester component of the type previously described in U.S. Pat. No. 7,963,583 dated Jun. 21, 2011 issued to the inventor and applicant of the instant application.

The high velocity impact force provided by the sludge digester component breaks down the fats, oil and greases as they impacts against the stationary ridges or blades disposed on the digester component. Atmospheric oxygen is then injected into the microparticulates created by the shearing action of the digester. As the structure of the fats, oil and greases are mechanically broken down, highly concentrated oxygen in the form of the allotrope ozone is introduced through the air intake of the digester. The combination of the shearing action provided by the digester along with the additional concentrated oxygen results in the breakdown of the fats, oil and grease molecular structure and prevents the particulates from reforming and settling out. The fats, oils and grease are converted into carbon dioxide and water along with saline and/or silica depending on the detergents used in the cleaning process and, of course, the FOG feed.

The actual sludge digester component of the present invention further discloses a method and apparatus for aerating liquid which includes a pressurized aeration chamber having an inlet port at its lower and an outlet port at its upper end wherein the chamber is divided into multiple internal chambers using a plurality of internal divider walls. The chamber is weighted with a base member so that it will not float. Air is inlet at its upper and through an air inlet hole into an upper air manifold wherein the air then travels downwardly through an air feed pipe to a plurality of air outlet holes wherein the air is released and rises, thereby causing a flow of material through the inlet ports upwardly along the internal divider walls and aeration chamber and then out of the chamber at its upper outlet port so that the stream of material is directed onto a series of stationary concentric ridges wherein the solids in the liquid material are forcefully impacted against the stationary concentric ridges so as to break the solid particles up into smaller particles.

An object of the present invention is to improve the quality of the water and/or wastewater which is treated in the present invention. Another object of the present invention is to treat and remove fats, oils and greases from wastewater. Another object of the present invention is for improving water quality of drinking water in undeveloped countries where water standards are seriously deficient. A further object of the present invention is to provide a compact treatment unit which can be installed under a sink of restaurants or the like for removing the fats, oil and greases from their wastewater discharges. A further object of the present invention is to provide a wastewater treatment apparatus or device which can be easily used by an operator. A further object of the present invention is to provide a system of treating wastewater which can be relatively easily and cheaply manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIGS. 1 and 2 are perspective views of the present invention.

FIG. 3 is an elevation view of portions of the present invention.

LIST OF REFERENCE NUMERALS

Figure 4:
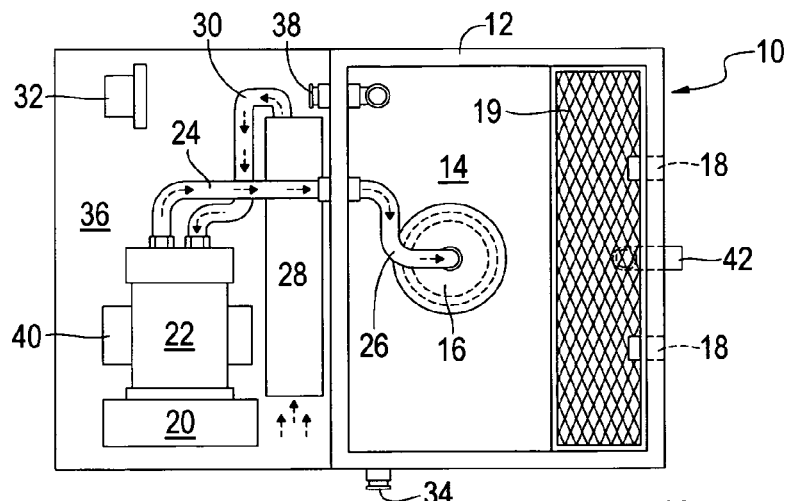
FIG. 4 is a plan view of the present invention.

With regard to reference numerals used, the following numbering is used throughout the drawings.

10 present invention
12 enclosure 14 aeration chamber
16 sludge digester unit
18 inlet for wastewater
19 screen for wastewater
20 air blower
22 electrical motor
24 air inlet
26 air inlet into digester unit
28 ozone generator
30 ozone inlet conduit
32 electrical on/off switch
33 electrical cord
34 outlet drain for enclosure
35 plug
36 base mount
37 electrical cord
38 auxiliary inlet/outlet
39 motor controller
40 base
41 conduit from air filter
42 outlet port
44 air filter
46 drop pipe
48 aeration chamber of sludge digester
50 inlet port for solids and liquids
52 outlet port for solids and liquids
54 internal chamber
56 internal walls/chamber dividers
58 base
60 air inlet
62 air manifold
64 air feed conduit
66 air outlet apertures
68 concentric ridges
70 bore
72 internal lock ring
74 floor
76 wall
78 surface of liquid
80 liquid flow direction arrow(s)
82 sludge particles
84 pump
90 intake conduit on blower
92 lid
94 fluid flow direction arrow(s)

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 9 illustrate the present invention wherein an apparatus for treating water and wastewater is disclosed which is generally indicated by reference number 10

Turning to FIG. 1, therein is shown the present invention 10 having an enclosure 12 with an internal aeration chamber 14 having an internal sludge digester component or unit 16 therein. Also shown are a pair of inlets 18 for the incoming water or wastewater which passes immediately through a screen 19 for solids removed from the wastewater as the wastewater enters the aeration chamber 14. Also shown mounted on a mounting base 36 is an air blower 20 driven by an electrical motor 22 mounted on base 40 which is controlled by an on/of felectrical switch 32. A conventional electrical cord 33 with plug 35 on its end is shown with electrical cord 37 connected from switch 32 to motor controller 39 on motor 22. Air from blower 20 travels through the air inlet conduit 24 into the interior of the chamber 14 and into the air inlet 26 of the sludge digester unit 16. Also shown is an ozone generator 28 for supplying ozone to blower 20 so that ozone and air can be input into the sludge digester unit 16. Also shown is an outlet drain 34 along the side of the enclosure 12 for removing wastewater from the interior of the enclosure 12. An auxiliary inlet/outlet 38 is provided for either inletting additional air from the blower 20 or for use as a discharge port. Also shown is air filter 44 which inputs air into blower 20 by means of conduit 41 extending from the air filter to the intake of the blower.

Turning to FIG. 2, therein is shown the present invention 10 having an enclosure 12 with an internal aeration chamber 14 having an internal sludge digester unit 16 therein. Also shown are a pair of inlets 18 for the incoming wastewater which passes immediately through a screen 19 for solids removed from the wastewater as the wastewater enters the aeration chamber 14. Also shown mounted on a mounting base 36 is an air blower 20 driven by an electrical motor 22 mounted on base 40. Air from blower 20 travels through the air inlet conduit 24 into the interior of the chamber 14 and into the air inlet 26 of the sludge digester unit 16. Also shown is an outlet drain 34 along the side of the enclosure 12 for removing wastewater from the interior of the enclosure 12. Also shown is air filter 44. Also shown is outlet port 42 on a back wall of enclosure 12.

Turning to FIG. 3, therein is shown intake conduit or port 90 into blower 20 which draws or sucks in ozone by vacuum from conduit 30 along with filtered air through conduit 41 from air filter 44 so that air and ozone are blown into digester unit 16. The direction arrows indicate the flow of air and ozone.

Turning to FIG. 4, therein is shown the present invention 10 having an enclosure 12 with an internal aeration chamber 14 having an internal sludge digester unit 16 therein. Also shown are a pair of inlets 18 for the incoming wastewater which passes immediately through a screen 19 for solids removed from the wastewater as the wastewater enters the aeration chamber 14. Also shown mounted on a mounting base 36 is an air blower 20 driven by an electrical motor 22 mounted on base 40 which is controlled by an on/off electrical switch 32. Air from blower 20 travels through the air inlet conduit 24 into the interior of the chamber 14 and into the air inlet 26 of the sludge digester unit 16. Also shown is an ozone generator 28 having an ozone conduit 30 connected to the inlet of blower 20 (as best shown in FIG. 3) so that ozone can be input into the sludge digester unit 16. Also shown is an outlet drain 34 along the side of the enclosure 12 for removing wastewater from the interior of the enclosure 12. An auxiliary inlet/outlet 38 is provided for either inletting air from the blower 20 or for use as a discharge port. Also shown is outlet port 42 on a back wall of enclosure 12. The direction arrows indicate the flow of air and ozone into the present invention 10.

Figure 5:
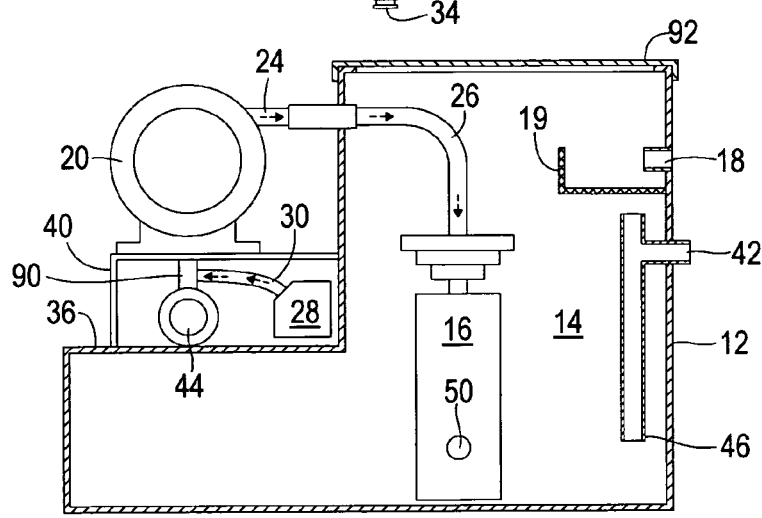
FIGS. 5 and 6 are cross-sectional views of the present invention.

Turning to FIG. 5, therein is shown the present invention 10 having an enclosure 12 having an air tight or sealing lid 98 for pressurizing an internal aeration chamber 14 having an internal sludge digester unit 16 therein. Also shown are a pair of inlets 18 for the incoming wastewater which passes immediately through a screen 19 for solids removed from the wastewater as the wastewater enters the aeration chamber 14. Also shown mounted on a mounting base 36 is an air blower 20 driven by an electrical motor mounted on base 40 which is controlled by an on/off electrical switch. Air from blower 20 travels through the air inlet conduit 24 into the interior of the chamber 14 and into the air inlet 26 of the sludge digester unit 16. Also shown is an ozone generator 28 having an ozone conduit 30 connected to the inlet 90 of blower 20 so that ozone can be input into the sludge digester unit 16. Also shown is air filter 44. Also shown is outlet port 42 on a back wall of enclosure 12 having a downwardly extending inlet or drop pipe 46 for receiving and then discharging materials from near the bottom of enclosure 12.

Figure 6:
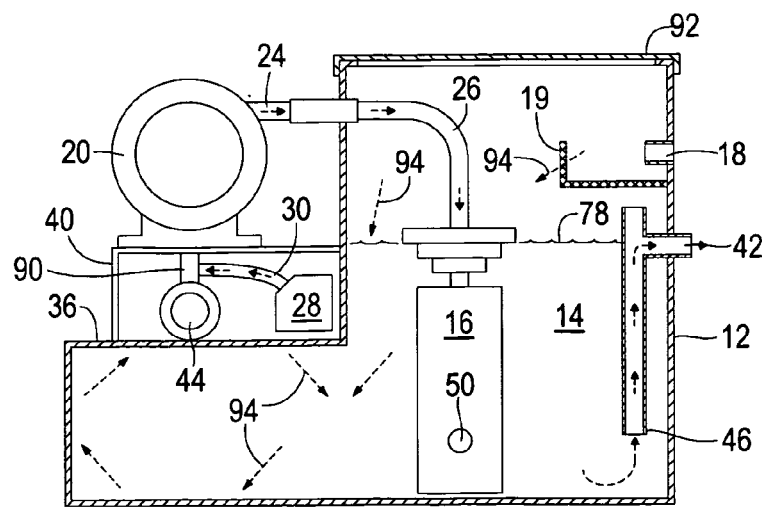

Turning to FIG. 6, the present invention 10 is shown similarly to FIG. 5 except that it additionally shows direction arrows showing air flow conduit 24 and fluid flow out through drop pipe 46 and also arrows 94 show fluid flow inside enclosure 12. Also shown is fluid surface 78 inside aeration chamber 14.

Figure 7:
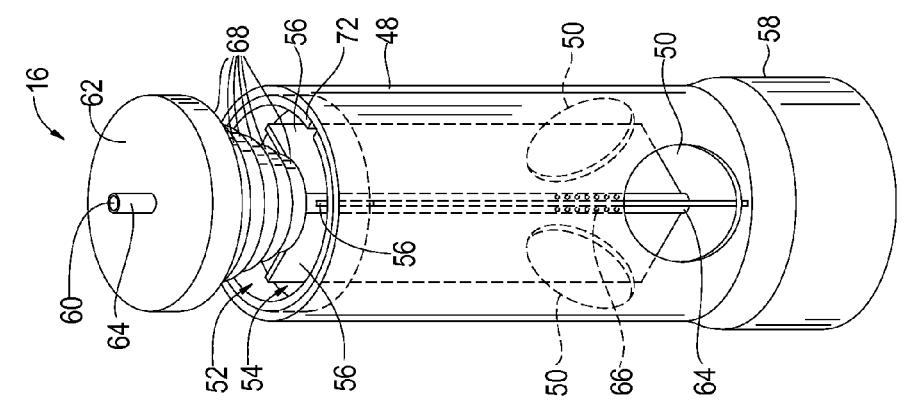
FIG. 7 is a perspective view of the sludge digester of the present invention.

Turning to FIG. 7, therein is shown the sludge digester 16 of the present invention 10 having an upwardly disposed aeration chamber 48, which may be cylindrically shaped, being somewhat elongated to assure aeration, having multiple liquid inlet ports 50 at its lower end and a circumferential liquid outlet port 52 at its upper end wherein the chamber is divided into multiple internal partitions or chambers 54 using a plurality of internal divider walls 56. In FIG. 7, by way of example, there are three internal chambers 54 illustrated which are formed by three walls, 56; however, the number of internal chambers could vary. Each internal chamber 54 has an associated inlet 50 and outlet 52 therein. The chamber 48 is effectively weighted at its lower end with a base member 58 so that it will not float but will remain substantially stationary. Base 58 may weight about 20 pounds and be made of concrete or the like. Air is inlet at its upper end through an air inlet hole 60 into an upper air manifold 62 (which may be sometimes generally referred to as the cutter head) wherein the air then travels downwardly through an air feed pipe/conduit 64 to a plurality of air outlet holes/apertures 66 wherein the air is released and rises thereby causing a circular-like flow of liquid and solid material through the inlet ports 50 upwardly along the internal wall/chamber dividers 56 and aeration chamber 48 and then out of the chamber at its upper outlet port 52 so that the stream of liquid material containing the solids is directed onto the series of stationary concentric ridges 68 wherein the solids in the liquid material are forcefully impacted or impinged against the stationary series of concentric ridges so as to break the larger solid particles up into smaller particles which impingement also improves mixing and thereby the oxygen transfer rate. The air pressure in conduit 64 is expected to range from 0.1 to 2.0 psi, and, more particularly is about 0.5 psi. The velocity of the liquid material as it impinges against ridges 68 is expected to range from 20 to 25 feet per second (fps), and, more particularly is about 20 fps. The air pressure in conduit 64 has an effective value to aerate the liquid and the velocity has an effective value to impinge the liquid against the ridges with enough force so as to break down the solids in the liquid into smaller solids. The ridges 68 are stair-stepped so that each successively higher ridge, i.e., toward the upper end of chamber 48, has a greater diameter than the preceding ridge. In FIG. 1, by way of example, six ridges 68 are illustrated; however, the number of ridges could vary. Outlet 52 encircles manifold 62; i.e., manifold 62 is substantially centrally disposed in aeration chamber 48 and outlet port 52, so that the ridges 68 on the manifold form a centrally disposed impingement member to assure maximum impingement of solids against ridges 68, i.e., impingement member. Internal lock ring 72 is shown which assists in securing the top of the walls 56 inside the chamber 48. Lock ring 72 also assists in the breakdown of FOG as it is impacted against the sharp edges of the lock ring.

Figure 8:
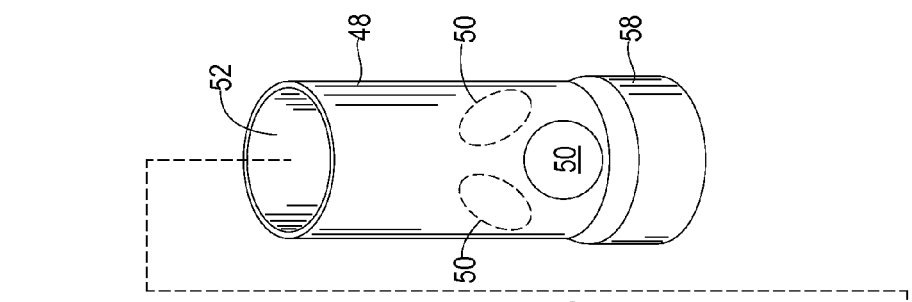
FIG. 8 is an exploded view of the sludge digester of the present invention.

Turning to FIG. 8, therein is shown the sludge digester 16 of the present invention 10 having an upwardly disposed cylindrical aeration chamber 48 being a walled chamber having upper and lower ends having multiple inlet ports 50 at its lower end and a circumferential outlet port 52 at its upper end wherein the chamber is divided into multiple internal partitions or chambers 54 using a plurality of internal divider walls 56. The chamber 48 is weighted with a base member 58 so that it will not float and remain substantially stationary. Air is inlet at its upper end through an air inlet hole 60 into an upper air manifold 62 wherein the air then travels downwardly through an air feed pipe 64 to a plurality of air outlet holes 66 wherein the air is released and rises thereby causing a flow of material through the inlet ports 50 upwardly along the internal divider walls 56 and aeration chamber 48 and then out of the chamber at its upper outlet port 52 so that the stream of material is directed onto the series of stationary concentric ridges 68 wherein the solids in the liquid material are forcefully impacted against the stationary concentric ridges so as to break the larger solid particles up into smaller particles. Walls 56 project radially from and may be integrally formed with the feed pipe 64 wherein the ends of the walls are substantially contiguous with or in close proximity to the wall of chamber 48 wherein the number of walls equal the number of partitions 54. Ring 72 is shown which assists in securing the top of the walls 56 inside the chamber 48. Feed pipe 64 has a bore 70 therein.

Figure 9:
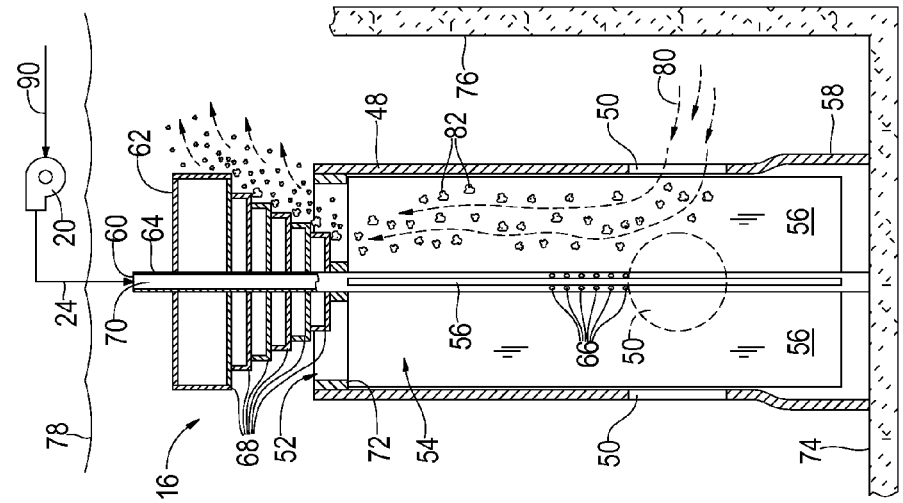
FIG. 9 is a cross sectional view of the sludge digester of the present invention.

Turning to FIG. 9, therein is shown the sludge digester 16 of the present invention 10 having an upwardly disposed cylindrical aeration chamber 48 having multiple inlet ports 50 at its lower end and a circumferential outlet port 52 at its upper end wherein the chamber is divided into multiple internal chambers 54 using a plurality of internal divider walls 56. The chamber 48 is weighted with a base member 58 so that it will not float and remain substantially stationary. Air is inlet at its upper end through an air inlet hole 60 into an upper air manifold 62 wherein the air then travels downwardly through an air feed pipe 64 to a plurality of air outlet holes 66 wherein the air is released and rises thereby causing a flow of material through the inlet ports 50 upwardly along the internal divider walls 56 and aeration chamber 48 and then out of the chamber at its upper outlet port 52 so that the stream of material is directed onto the series of stationary concentric ridges 68, which serves as an impingement member, wherein the solids in the liquid material are forcefully impacted against the stationary concentric ridges so as to break the larger solid particles up into smaller particles. Ring 72 is shown which assists in securing the top of the walls 56 inside the chamber 48. Feed pipe 64 has a bore 70 therein. Also shown are floor 74 and wall 76 of the vessel/tank holding the liquid and the liquid level 78. Also shown is the flow pattern set up by the aeration in the present invention shown by the liquid flow direction arrows 80. Also shown are the sludge particles 82 being impinged against ridges 68 so as to be broken up from larger into smaller particles, the air blower or pump 20 and the air inlet conduit 24 for conveying air from the pump to the sludge digester 16 and the air intake conduit 90 for inletting air and ozone into the pump or blower.

By way of reference to FIGS. 1 through 9, the present invention 10 has a pressurized vessel 12 (less than 1.0 psi) constructed of stainless steel and designed to capture grey water from commercial establishments (restaurants) and/or residential dwellings for the purpose of oxidizing and removing fats, oils and greases on contact.

Its primary, but not the only function, is to treat and permanently remove fats, oils and greases by oxidation prior to fats, oils and grease deposits entering grease traps, oil/water separators, lift stations, or municipal sewer systems. The removal, in this case, the molecular breakdown of the fats, oils and greases, will prevent the need for pumping out grease traps which will be beneficial to the commercial establishment.

Another use of the present invention 10 is to improve drinking water quality in underdeveloped countries where water standards are seriously deficient. By incorporating features of the sludge digester component 16 of the present invention 10 disclosed in U.S. Pat. No. 7,963,508, with addition of ozone through advanced oxidation processing, it is possible to remove deadly bacteria such as Vibrioe (causative agents of cholera), *Shigella* (causative agents of typhoid fever, and *Shigella* (causative agents of bacillary dysentery), *Salmonella* (causative agents of typhoid fever and of salmonellosis, depending on the particular organism), pathogenic strains of *Escherichia coli, Listeria monocytogenes* (causative agent of Listeriosis), Hepatitis viruses (types A, B and C), and many other forms of pathogens commonly encountered in drinking water in underdeveloped countries.

The present invention 10 incorporates the technology of the sludge digester 16 component as disclosed in U.S. Pat. No. 7,963,508 and advanced oxidation processing, that is to say, ozone with hydroxyl radicals. The introduction of the ozone through advanced oxidation processing increases the dissolved oxygen levels which in turn can reduce the reaction or contact time significantly.

The present invention 10 comprises a compact tank 12 typically located beneath a commercial sink or dishwasher and contains a sludge digester 16 component. The high velocity impact force breaks down the fats, oils and greases as they impact against the stationary ridges 68 or blades housed within the digester. Atmospheric oxygen and ozone is then injected into the microparticulates created by the shearing action of the digester 16. As the structure of the fats, oils and greases are mechanically broken down, highly concentrated oxygen in the form of the allotrope ozone is introduced through the air intake of the digester 16. The combination of the shearing action provided by the digester 16 along with the additional concentrated oxygen from air and ozone results in the breakdown of the fats, oils and greases molecular structure and prevents the particulates from reforming and settling out. The fats, oils and greases are converted into carbon dioxide and water along with saline and/or silica depending on the detergents used in the cleaning process and, or course, the fats, oils and greases feed.

By way of summary with reference to FIGS. 1-9, the present invention 10 provides a method for treating fluid, the fluid comprising water and wastewater, comprising the steps of: providing an enclosure 12 for housing the apparatus, wherein the enclosure is adapted for being sealed; the enclosure having an internal area, wherein the internal area is an aeration chamber 14; providing a sludge digester 16 internal the enclosure for digesting pollutants contained in the fluid; providing an inlet 18 and an outlet 42 on the enclosure to permit the fluid to be inlet into the enclosure and outlet from the enclosure; straining 18 the fluid as the fluid is inlet into the enclosure; supplying air 24 to the internal area of the enclosure, filtering 44 the air supply; supplying ozone 28 into the internal area of the enclosure; wherein the sludge digester further comprises the steps of: providing an upright standing aeration chamber 48 having upper and lower ends, the aeration chamber having a circumferential wall; providing a liquid inlet 50 on the lower end of the aeration chamber and a liquid outlet 52 on the upper end of the aeration chamber; providing an upright standing air feed conduit 64 having a bore 70 and having upper and lower ends being substantially centrally disposed in the aeration chamber, the conduit having a plurality of air outlet apertures 66 therein, wherein the plurality of air outlet apertures are disposed adjacent the lower end of the air feed conduit, the conduit having an air inlet 60 on the upper end of the conduit, wherein the air inlet is connected to the air supply; providing a plurality of walls 56 projecting radially from the air feed conduit, the walls extending from the upper to lower ends of the air feed conduit, each wall having an end, wherein the end is contiguous to the wall of the aeration chamber, a plurality of partitions or chambers 54 disposed in the aeration chamber between each wall; providing an air manifold 62 being disposed on the upper end of the air feed conduit, the manifold having upper and lower ends, the air manifold adapted so that air can flow through the manifold to the air outlet apertures of the air feed conduit; and, providing an impingement member 68 disposed between the upper end of the air manifold and the liquid outlet so that the body of liquid is impinged against the impingement member, wherein the fluid is treated. Furthermore, wherein the liquid inlet further comprises a plurality of liquid inlet apertures 50, the inlet apertures of the liquid inlet being disposed in the wall of the aeration chamber so that each partition/chamber has one liquid inlet aperture for inletting liquid to the partition; wherein there are three partitions; wherein the impingement member comprises a plurality of concentric ridges 68, wherein the ridges are disposed on the lower end of the manifold and each successively higher ridge has a greater diameter than the preceding lower ridge; further comprising the step of providing a weighted base 58 on the lower end of the aeration chamber so that the aeration chamber is substantially stationary in the body of fluid in the enclosure; pressurizing the internal area to have an internal atmospheric pressure greater than external atmospheric air pressure; and, providing a blower 20 for pressurizing the internal area, the blower also for supplying air to the internal area.

I claim:

1. An apparatus for treating fluid, the fluid comprising water and wastewater, comprising:
   a) an L-shaped enclosure adapted for being sealed; said enclosure having a horizontal foot portion and a vertically extending upright portion, and an internal area extending throughout said portions;
   b) a sludge digester within said upright portion for digesting pollutants;
   c) an inlet port for said fluid on a first side of said upright portion adjacent a top thereof and an outlet port disposed below and spaced from said inlet port of said upright portion for the fluid to be inlet into said enclosure and outlet from said enclosure, respectively;
   d) a fluid strainer disposed internal said enclosure between said inlet and outlet ports so that the fluid is strained as the fluid is inlet into said enclosure;
   e) said foot portion forming a base for an air supply for supplying air through a second side of said upright portion to an air inlet conduit at a top of said sludge digester, and an air filter for filtering said air supply,
   f) an ozone generator mounted on said foot portion adjacent said air supply for injecting ozone into an air intake to a blower supplying said air to said sludge digester,
   g) a side opening in said sludge digester for receiving said fluid, said sludge digester having an aeration chamber in which flowing air and fluid mix; and
   h) said sludge digester being constructed and arranged so that said fluid along with an aerating mixture of air and ozone are upwardly flowing and pass out through a digester outlet port at an upper end of said sludge digester surrounding said air inlet conduit, said exiting mixture impinging on concentric ridges surrounding said inlet conduit above said digester outlet port so that solids in said fluid are forcefully impacted to break larger solid particles into smaller particles to facilitate removal of fats, oils and greases by oxidation; whereby i) said fluid substantially cleansed of fats, oils and greases by oxidation exit said enclosure through said upright outlet port for discharge into oil/water separators, lift stations or municipal sewer systems.

2. The apparatus of claim 1, further comprising a weighted base being disposed on said lower end of said aeration chamber so that said aeration chamber is substantially stationary in the body of fluid in said enclosure.

3. The apparatus of claim 1, wherein said strainer comprises a horizontal portion extending out from said first side of said upright portion and an upwardly extending portion of said screen at a distal end of said horizontal portion of said screen.

4. The apparatus of claim 3, wherein said blower pressurizes said enclosure.

5. A method for treating fluid comprising water and wastewater, comprising the steps of:
 a) providing an L-shaped enclosure adapted for being sealed; said enclosure having a horizontal foot portion and a vertically extending upright portion, and an internal area extending throughout said portions;
 b) providing a sludge digester within said upright portion for digesting pollutants;
 c) providing an inlet port for said fluid on a first side of said upright portion adjacent a top and an outlet port disposed below and spaced from said inlet port of said upright portion for the fluid to be inlet into said enclosure and outlet from said enclosure;
 d) straining the fluid entering said enclosure between said inlet;
 e) said foot portion forming a base for an air supply for supplying air through a second side of said upright portion to an air inlet conduit at a top of said sludge digester, and an air filter for filtering said air supply;
 f) providing an ozone generator mounted on said foot portion adjacent said air supply for injecting ozone into an air intake to a blower supplying said air to said sludge digester;
 g) said sludge digester receiving said fluid through a side opening, said sludge digester having an aeration chamber in which flowing air and fluid mix; and
 h) said sludge digester being constructed and arranged so that said fluid along with an aerating mixture of air and ozone are upwardly flowing and pass out through a digester outlet port at an upper end of said sludge digester surrounding said air inlet conduit, said exiting mixture impinging on concentric ridges surrounding said inlet conduit above said digester outlet port so that solids in said fluid are forcefully impacted to break larger solid particles into smaller particles to facilitate removal of fats, oils and greases by oxidation; whereby
 i) said fluid substantially cleansed of fats, oils and greases by oxidation exit said enclosure through said upright outlet port for discharge into oil/water separators, lift stations or municipal sewer systems.

6. The method of claim 5, further comprising the step of providing a weighted base on the lower end of the aeration chamber so that the aeration chamber is substantially stationary in a body of fluid in the enclosure.

7. The method of claim 6, providing said strainer with a horizontal portion extending out from said first side of said upright portion and an upwardly extending portion at a distal end of said horizontal portion thereof.

8. The method of claim 7, in which said blower pressurizes the enclosure.

* * * * *